Jan. 5, 1954 A. J. HORNFECK 2,665,066
ELECTRIC CALCULATING CIRCUITS
Original Filed Dec. 1, 1945 2 Sheets-Sheet 2

INVENTOR.
ANTHONY J. HORNFECK
BY
Raymond W. Jenkins
ATTORNEY

Patented Jan. 5, 1954

2,665,066

UNITED STATES PATENT OFFICE 2,665,066

ELECTRIC CALCULATING CIRCUITS

Anthony J. Hornfeck, Lyndhurst, Ohio, assignor to Bailey Meter Company, a corporation of Delaware Original application December 1, 1945, Serial No. 632,216. Divided and this application October 4, 1950, Serial No. 188,433

1 Claim. (Cl. 235—61)

This invention relates particularly to electric circuits for calculating, such as multiplying, dividing, extracting functional relations, etc. In general usefulness the invention provides for interrelating the instantaneous values of variables. Such variables may be quantities, qualities, conditions, positions, or the like.

By way of specific example I have chosen to illustrate and describe a continuous calculating circuit involving the compensation of a fluid rate of flow for variations in its density from design conditions of density. Inasmuch as weight rate or volume rate of fluid flow is readily inferentially obtained by producing a pressure differential varying in functional relation with the rate of flow, I incorporate the extraction of the functional relation at the same time as making the necessary compensation for deviations in temperature, pressure or density of the fluid from design conditions.

It will be appreciated that I take this merely as a preferred example of variables interdependent upon each other and not as limiting.

Figure 1:
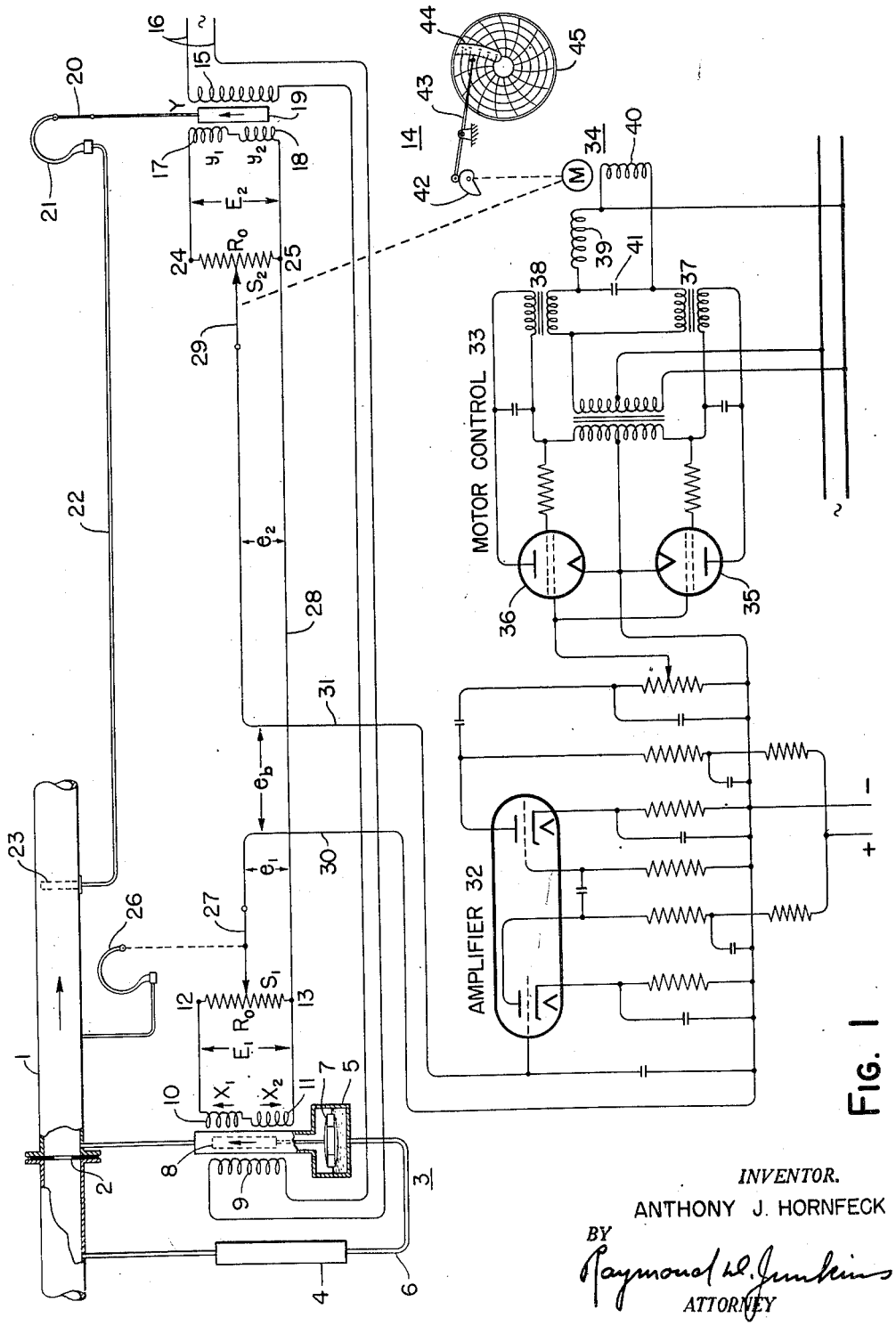
Fig. 1 is a schematic electric circuit for a fluid flow meter with temperature and pressure compensation.

In Fig. 1, I show diagrammatically a balanceable electrical network primarily useful, by way of example, in connection with the measurement of a variable, such as the rate of flow of a fluid through a conduit 1.

It is common in the metering art to insert a restriction, such as an orifice plate 2, in the path of the fluid flow and thus obtain a "head" or differential pressure bearing a functional relation to rate of fluid flow through the restriction. The relation between volume flow rate and differential pressure (head) is:

$$Q = cM\sqrt{2gh} \qquad (1)$$

where $Q$ = cu. ft. per sec.
$c$ = coefficient of discharge
$M$ = meter constant (depends on pipe diameter and diameter of orifice hole)
$g$ = acceleration of gravity = 32.17 ft. per sec.
$h$ = differential head in ft. of the flowing fluid The coefficient of discharge remains substantially constant for any one ratio of orifice diameter to pipe diameter regardless of the density or specific volume of the fluid being measured. With $c$, $M$ and $\sqrt{2g}$ all remaining constant then $Q$ varies as $\sqrt{h}$.

If it is desired to measure the flowing fluid in units of weight, then Equation 1 becomes:

$$W = cM\sqrt{2ghd} \qquad (2)$$

where $W$ = rate of flow in pounds per sec.
$d$ = density in pounds per cu. ft. of the flowing fluid
$h$ = differential head in inches of a standard fluid such as water
$M$ = meter constant now including a correction between the density $d$ of the flowing fluid being measured and the density of the liquid in the manometer which is some standard such as water In each case, whether the measurement is in volume rate or in weight rate, it will be observed that the rate varies as $\sqrt{h}$, i. e. as the square root of the differential pressure measured across the orifice or other restriction 2.

It will further be noted that when a measurement in terms of weight rate of flow is desired the $d$ in Equation 2 is representative of density in pounds per cubic foot of the flowing fluid under expected or design conditions of density. In other words, the flow metering system is designed to have a maximum capacity in weight rate of flow of fluid at a certain density, and the density of most fluids is a function of the fluid temperature and pressure. If the fluid is a true gas the relation of actual density to design density is directly with change in pressure and inversely with change in temperature. In accurately measuring the weight rate of fluid flow it becomes necessary, therefore, to continuously ascertain the density, or some function of the density, of the fluid as it is flowing past the point of measurement. If the actual density condition deviates from the design density condition, then a correction factor should be applied to the weight rate inferentially indicated as differential pressure or head.

Under certain conditions one of the variables of which density is a function, for example, either temperature or pressure, may remain constant and only one of them fluctuate. In this event a correction of the volume flow rate should be made for the fluctuating function of density so that a correct weight rate measurement will be obtained.

Numerous complicated metering arrangements have been proposed and used for extracting the square root relationship between head and rate. The simplest possible form of U-tube manometer with a float on the mercury in one leg will provide a measurement of the differential pressure. The complication occurs in the mechanism necessary to translate such float motion into terms of rate of flow.

In a large percentage of applications it is desired to provide one or more remote indications (or recordings) of the flow measurement. Various telemetric schemes have been proposed and used, either hydraulic, pneumatic or electrical.

My invention, as illustrated by one embodiment in Fig. 1, provides a simple and accurate solution of the problems above stated, namely, a remote visual indication of the measurement of a fluid flow in terms of weight rate compensated or corrected for deviations in actual density of the flowing fluid from design density.

Referring now specifically to Fig. 1, I show a flow meter 3 comprising a U-tube having legs 4 and 5 joined by a tube 6. A sealing liquid, such as mercury, partially fills the U-tube. On the surface of the mercury in leg 5 is a float 7 adapted to position a magnetic member such as a core piece 8 within a portion of the leg 5 of non-magnetic material.

The basic telemetering circuit involved is disclosed in my copending application Serial No. 569,479, now Patent 2,439,891, wherein the meter 3, which I will term the transmitter, comprises a movable core transformer having a primary alternating current energized winding 9 and a pair of bucking secondary windings 10, 11. The bucking secondary windings 10, 11 are inductively energized from the primary winding 9 through the agency of the core 8. When the core is in a central or neutral location relative the windings 9, 10 and 11 a voltage $E_1=0$ exists across the terminals 12, 13. When the core is moved from neutral position toward one end of the coil assembly a voltage $E_1$ is developed as a function of core position. The relation is linear over the operating range. I designate the motion of the core 8 from its neutral position as 1 or 100% for a movement corresponding to maximum range of the apparatus. The percentage or proportionate movement for any mathematical consideration of the system is designated as $x$. Thus for $x$ movement of the core 8 there will be a certain change in the voltage $E_1$ across the terminals 12, 13.

At 14 I indicate what I term a receiver including the necessary elements for maintaining the network in balance and for providing a visual indication and/or record of the flow rate. The receiver may be located adjacent to or remote from the transmitter.

It will be appreciated that while I am describing my invention as applied to the measurement of a fluid rate of flow, this is by way of example only and the invention may be in similar manner applied to the measurement of other variables involving a functional relationship in their determination or interpretation, or which should be multiplied or divided by another variable.

At the receiver I show an alternating current energized primary winding 15 similar to the primary winding 9 and connected in series therewith across an alternating current source of power 16. I also provide at the receiver a pair of bucking secondary windings 17, 18 similar to the transmitter windings 10, 11. Coupling the windings 15, 17 and 18 is a core piece 19 positionable through suitable linkage 20 by a Bourdon tube 21. The Bourdon tube 21 forms a part of a pressure filled temperature responsive system having a connecting capillary 22 connecting the Bourdon tube 21 to a bulb 23 which is located in the conduit 1 sensitive to actual temperature of the fluid flowing therethrough.

Across the terminals 24, 25 of the secondary windings 17, 18 is included a resistance $R_0$.

The windings 10, 11 are in bucking relation and the voltages across these windings I have designated as $x_1$ and $x_2$. When the core 8 is in central or neutral position relative to the windings 10, 11, $x_1-x_2=0$ so that $E_1=0$. Likewise at the receiver the voltages in the windings 17, 18 are bucking and the individual voltages $y_1$ and $y_2$ are equal and cancel so that the voltage across the terminals 24, 25, namely, $E_2=0$. Under a balanced condition with design conditions of flow, temperature and pressure prevailing $E_1=E_2$ and $e_b=0$.

Sensitive to pressure of the fluid in the conduit 1 is a Bourdon tube 26 adapted to position a contact arm 27 along the resistance $R_0$ which spans the terminals 12 and 13. The terminals 13 and 25 are joined by a conductor 28. The contact arms 27 and 29 are joined by conductors 30, 31 respectively. Across the conductors 30, 31 is a voltage $e_b$ which, when the system is balanced, will equal zero.

The circuit including the windings 10, 11, 17, 18, the resistances $R_0$ and the conductors 28, 30 and 31 comprise a balanceable network of the null type. Interposed between the contact arms 27 and 29, sensitive to the voltage $e_b$, is an amplifier 32 and motor control circuit 33 for controlling a reversible motor 34. When the circuit is unbalanced through movement of the cores 8 or 19 or of the contact arms 27 or 29 then the direction and extent of such unbalance is evidenced by an alternating current of plus phase or of minus phase between the conductors 30, 31 and a voltage $e_b$ representative of the extent of unbalance.

The amplifier 32 and motor control circuit 33 are disclosed in Ryder Patents 2,275,317 and 2,333,393 as well as in my Patent No. 2,439,891. Suffice it to say that the amplifier 32 is phase sensitive to the voltage $e_b$ for selective control of the electron discharge devices 35, 36, which in turn selectively control the saturable core reactors 37, 38 as well as the magnitude of their output. The motor 34 is of the capacitor-run type having two windings 39, 40 ninety electrical degrees apart and a capacitor 41. When current flow is through one of the windings directly across the alternating current source and through the other winding in series with the capacitor across the alternating current source the motor rotates in predetermined direction. The direction of rotation and speed thereof is determined by whether the saturable core reactor 37 or reactor 38 predominates and the magnitude or extent of predominance.

In operation, assuming a balanced electrical condition of the network, a change in the position of either the core 8 or the core 19 or of the contact arm 27 or the contact arm 29 will unbalance the network. The direction of such unbalance and the magnitude thereof will be evidenced by a plus phase or a minus phase across the conductors 30, 31 and by the magnitude of the voltage $e_b$. The phase sensitive amplifier 32 controls the circuit 33 to cause the motor 34 to rotate in predetermined direction and speed to position the contact arm 29 along the resistance $R_0$ until the network is in balance, at which time $e_b=0$ and motor rotation ceases. The motor rotation is in accordance with the movement $x$ modified by change in position of the contact arm 27 and by the change in position or movement $y$, or in other words in accordance with differential pressure corrected for any change in temperature and/or pressure of the flowing fluid from design conditions.

The motor 34, in addition to moving the balancing contact arm 29 relative to its resistor $R_0$ also positions a cam 42, in turn positioning indicating arm 43 relative to the scale 44 and revoluble chart 45. By shaping the cam 42, or tapering the slide wire 24—25 the square root relationship between weight rate of fluid flow and differential pressure may be extracted and the corrected flow read upon the scale 44 and chart 45.

In operation if the weight rate of fluid flow through the conduit 1 is unvarying and the temperature and pressure of the fluid is the same as design conditions, i. e. density constant, then $e_b=0$, the network is in balance and the motor 34 does not rotate. If a change in rate of flow occurs, then the core 8 will be moved, the circuit will be unbalanced, the motor 34 will rotate and position the balancing arm 29 until the network is in balance for the new rate of flow. The new rate of flow will be shown in corrected weight rate upon the scale 44 and chart 45. In similar manner, if the temperature of the fluid or the pressure of the fluid deviates from design value, either the core 19 or the contact arm 27 will be moved from its previous position, unbalancing the circuit, resulting in a movement of the motor 34 to rebalance the circuit through positioning the arm 29 and indicating visually the corrected weight rate of flow.

The operation of the system is as follows:
Assume
$x$ and $y$=motion of cores in percent of full travel
$n$ and $m$=motion of contacts 27, 29 in percent of full travel
$S_1$ and $S_2$ represent the portion of the resistance $R_0$ included in the circuit 27, $S_1$, 28, $S_2$, 29, 30, 31.
Then when $y=0$, core 19 is centered relative to coils 17, 18 and $$y_1=y_2$$
$$E_2=0$$

When $e_1=e_2$ then $e_b=0$ (circuit is balanced)

$$e_1 = E_1 \frac{S_1}{R_0}$$
$$e_2 = E_2 \frac{S_2}{R_0}$$

Hence at balance $$E_1 \frac{S_1}{R_0} = E_2 \frac{S_2}{R_0} \quad (3)$$

Now
$$E_1 = Kx \text{ and } E_2 = Ky$$

where $K=E_0=E_1=E_2$ when X and Y are max.
$S_1=nR_0$ and $S_2=mR_0$
By substitution of values $E_1$, $E_2$, $S_1$ and $S_2$ in Equation 3

$$Kx \times \left(\frac{nR_0}{R_0}\right) = Ky \times \left(\frac{mR_0}{R_0}\right)$$

and
$$xn = ym$$
or
$$m = \frac{xn}{y} \quad (4)$$

For flow meter compensation (gas flow)
$h$=differential pressure across an orifice in terms of max. differential
$= \frac{H}{H_0}$ where $H$ = actual differential,
$H_0$ = diff. at max. flow.

$P$=pressure of gas in terms of design press.
$= \frac{P}{P_0}$ where $P$ = actual pressure (absolute),
$P_0$ = design pressure (absolute)

$t$ =gas temperature in terms of design temp.
$= \frac{T}{T_0}$ where $T$ = actual temp. (0° F. absolute)
$T_0$ = design temp. (0° F. absolute)

$Q_0$=max. design flow

Where $A$=a constant, $D$=actual density of gas, $D_0$=design density of gas and $Q$= flow at H, P and T conditions.
Then $$Q_0 = A\sqrt{H_0 D_0}$$
$$Q = A\sqrt{HD}$$

Hence flow corrected $$\frac{Q}{Q_0} = \sqrt{\frac{HD}{H_0 D_0}}$$

$$\frac{D}{D_0} = \frac{PT_0}{P_0 T} \text{ for gas}$$

$$\text{Flow} = \sqrt{\frac{H}{H_0} \frac{PT_0}{P_0 T}} \quad (5)$$

Since $H=hH_0$ and $P=pP_0$ and $T=tT_0$ Equation 5 becomes $$\text{Flow} = \sqrt{\frac{hH_0}{H_0} \frac{pP_0}{P_0} \frac{T_0}{tT_0}}$$
$$= \sqrt{\frac{hp}{t}} \quad (6)$$

In the system of Fig. 1 the position of the core 8, represented by the letter $x$, is determined by the pressure differential across the orifice 2, represented by the letter $h$ in Equation 5. The positions of the contact arm 27 and the core 19, represented by the letters $n$ and $y$, respectively, are determined by the pressure and temperature in conduit 1, represented by the letters $p$ and $t$ in Equation 5. It will therefore be seen that:

$$\sqrt{\frac{hp}{t}} = \sqrt{\frac{xn}{t}} \quad (7)$$

It is seen that the expressions under the radical signs of Equation 7 are the same as the value of $m$ by Equation 4. This circuit in itself does not extract the square root so that the resulting motion of the motor and balancing slide wire is in accordance with $$\frac{xn}{p}$$

As previously mentioned, the flow rate in terms of weight W or in terms of Equation 7 may be accomplished by shaping the cam 42 to extract the radical of Equation 7.

Figure 2:
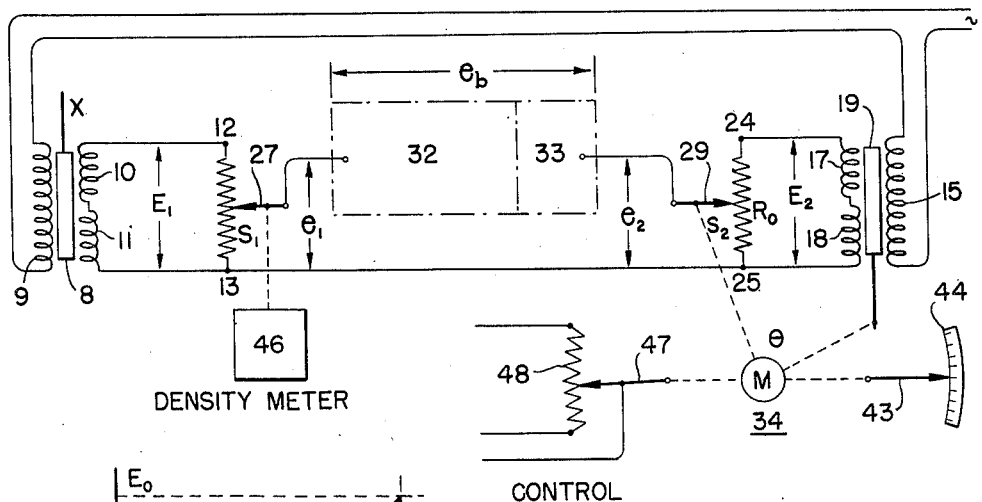
Fig. 2 is a modification including compensation through the agency of a density meter.

Referring now to Fig. 2, I show therein an arrangement wherein the square root relationship is extracted electrically in addition to the density correction. Herein the contact arm 27 is positioned by a density meter 46 of known type. The motor 34 simultaneously positions the contact arm 29 and the core 19 in equal ratios relative respectively the resistance $R_0$ and the secondary windings 17, 18. In this embodiment the angular motion of the motor 34 is represented by $\theta$ and is in accordance with the corrected weight rate of fluid flow so that the motor may position an indicating arm 43 relative to a scale 44 to give a visual indication in terms of weight rate of flow corrected to design conditions of density. At the same time the motor may position a contact arm 47 relative a slide wire 48 to provide for control of a variable which may be the same variable causing the movement $x$ or another variable.

Figure 3:
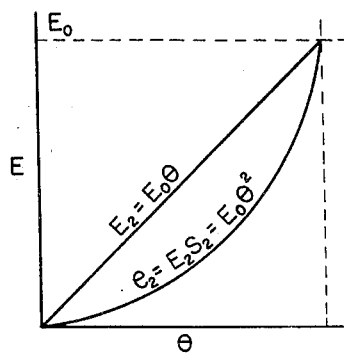
Fig. 3 is a graph in connection with Figs. 1, 2 and 4.

Referring to the basic circuit at either end of the diagram Fig. 2, including a core piece positionable relative a primary and two secondary windings, the latter spanned by a slide wire resistance having a movable contact, a fundamental consideration is that if the core is moved proportional to a quantity and the slide contactor is moved in proportion to another quantity, i. e. one variable and another variable, the resultant voltage will be proportional to the products of the voltages, thus $e_2 = S_2 E_2$. This relationship is shown in Fig. 3 in connection with movement of the core 19 simultaneously with movement of the contact arm 29 by the motor 34 a per unit distance $\theta$.

Figure 4:
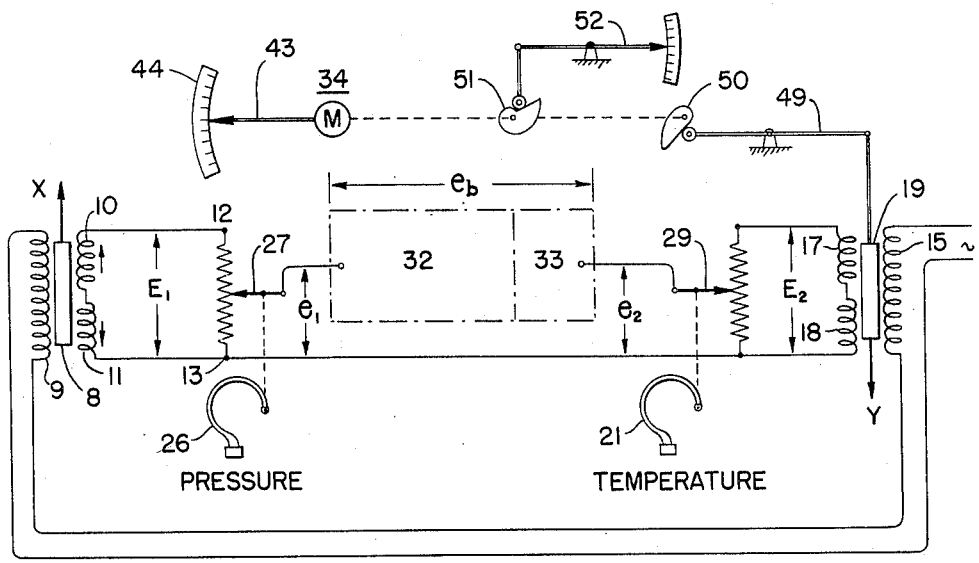
Fig. 4 is a further modification including the extraction of functional relation.

In the arrangement of Fig. 4 I show the core 8 positioned in accordance with differential pressure, the contact arm 27 in accordance with fluid pressure, the contact arm 29 in accordance with fluid temperature, and the core 19 through the agency of a rocker arm 49 and cam 50. The core 19 is thus positioned by the motor 34 to balance the circuit (following an unbalance thereof) in accordance with the functional shape of the cam 50. The motor rotation and the cam 51 being linear then the motion of the indicator arms 43 and 52 are linear with a uniform rise cam 51. The cam 50 may be a square root cam for extracting the functional relationship between differential pressure and weight rate of fluid flow, or may be for example of the five halves power if the system is measuring the weight rate of liquid flow over a V-notch weir for example, wherein the motion $x$ is in accordance with changes in head of liquid over the weir.

In general, Fig. 4 shows the possibility of correcting one variable for its functional relation with another variable and additionally correcting for variations in two other variables.

While I have illustrated and described certain embodiments of my invention in connection with measuring fluid rate of flow in terms of a function of differential head corrected for variations in density, it will be appreciated that the calculating circuit is not limited thereto. Other functional relations of a variable may be extracted and other variables may be included in a multiplying and/or dividing arrangement in connection with the first variable. For example, the circuit may be arranged to produce a ratio between two variables either of which may be compensated for fluctuations of a contributing variable. Furthermore, it is not essential that the result be visually indicated, as it may be used in control of the same or other variables with or without visual indication.

This application constitutes a division of my copending application Serial No. 632,216, filed December 1, 1945, now abandoned.

What I claim as new, and desire to secure by Letters Patent of the United States, is:

In a flow meter compensating and recording system, in combination, a pair of three coil reactors each having a primary energized by alternating current, two opposed secondaries and a core movable through a predetermined range to change the output of the secondaries from zero to a predetermined maximum with a linear relation between core position and output potential; means to move one of said cores to provide a potential representative of the square of a flow measuring variable in terms of a ratio to said maximum; an adjusting potentiometer across the output of the secondaries controlled by said core; means to adjust the slider of said potentiometer to a ratio of the maximum output thereof representative of a variable modifying the flow measuring variable; a slider equipped potentiometer shunting the secondary of the other reactor; the output of the two potentiometers being connected in circuit in opposition; reversible motor means adapted to be operated in speed and direction in accordance with the direction and unbalance of potential in said circuit; said motor being arranged to balance said circuit by simultaneously adjusting the core of the second reactor and the slider of the second potentiometer both to the same ratio whereby the square root of the said first variable as modified by the second variable is extracted; and means actuated by said motor to directly indicate on a linear scale the value of said modified variable.

ANTHONY J. HORNFECK.

References Cited in the file of this patent

UNITED STATES PATENTS

| Number | Name | Date |
|---|---|---|
| 1,826,762 | Franklin | Oct. 13, 1931 |
| 1,986,986 | Swartwout | Jan. 8, 1935 |
| 2,310,955 | Hornfeck | Feb. 18, 1943 |
| 2,331,138 | Ryder | Oct. 5, 1943 |
| 2,346,838 | Haight | Apr. 18, 1944 |

FOREIGN PATENTS

| Number | Country | Date |
|---|---|---|
| 553,947 | Great Britain | June 11, 1943 |